(12) United States Patent
Riley

(10) Patent No.: US 8,215,104 B2
(45) Date of Patent: Jul. 10, 2012

(54) ENERGY FROM SUBTERRANEAN RESERVOIR FLUID

(76) Inventor: William Riley, New York, NY (US)

(*) Notice: Subject to any disclaimer, the term of this patent is extended or adjusted under 35 U.S.C. 154(b) by 954 days.

(21) Appl. No.: 12/240,535

(22) Filed: Sep. 29, 2008

(65) Prior Publication Data

US 2010/0077749 A1    Apr. 1, 2010

(51) Int. Cl.
F16D 31/02    (2006.01)
F01B 13/00    (2006.01)
(52) U.S. Cl. .................................. 60/398; 290/54
(58) Field of Classification Search ........... 60/398; 290/43, 54
See application file for complete search history.

(56) References Cited

U.S. PATENT DOCUMENTS

| | | | |
|---|---|---|---|
| 3,140,986 A | 7/1964 | Hubbard | |
| 3,342,267 A | 9/1967 | Cotter et al. | |
| 3,736,744 A | 6/1973 | Bailey | |
| 3,751,673 A | 8/1973 | Sprankle | |
| 3,817,038 A | 6/1974 | Paull et al. | |
| 3,864,917 A | 2/1975 | Jacoby | |
| 3,931,851 A | 1/1976 | Harris et al. | |
| 4,052,857 A | 10/1977 | Altschuler | |
| 4,132,269 A | 1/1979 | Chasteen | |
| 4,201,060 A | 5/1980 | Outmans | |
| 4,248,305 A | 2/1981 | Scarbrough et al. | |
| 4,282,444 A | 8/1981 | Ramer | |
| 4,310,769 A | 1/1982 | Mazzone et al. | |
| 4,342,196 A | 8/1982 | Yeh | |
| 4,424,677 A | 1/1984 | Lukasavage | |
| 4,448,237 A | 5/1984 | Riley | |
| 4,607,169 A | 8/1986 | Donnelly, Jr. | |
| 5,148,677 A | 9/1992 | Doron et al. | |
| 5,582,011 A | 12/1996 | Bronicki et al. | |
| 5,685,362 A | 11/1997 | Brown | |
| 6,029,453 A | 2/2000 | Mendive | |
| 6,301,894 B1 | 10/2001 | Halff | |
| 6,396,162 B1 | 5/2002 | Carrillo | |
| 6,554,074 B2 | 4/2003 | Longbottom | |
| 7,084,521 B1 | 8/2006 | Martin | |
| 7,615,882 B2 | 11/2009 | Riley | |
| 2007/0187160 A1 | 8/2007 | Raoul | |
| 2007/0223999 A1 | 9/2007 | Curlett | |
| 2009/0120090 A1 | 5/2009 | DuBois | |
| 2009/0126923 A1 | 5/2009 | Montgomery et al. | |

FOREIGN PATENT DOCUMENTS

JP    57-062976    4/1982

(Continued)

OTHER PUBLICATIONS

International Search Report & Written Opinion dated May 18, 2010, corresponding to PCT/US2009/058595.
International Preliminary Report on Patentability dated Aug. 24, 2010, corresponding to PCT/US2009/034627.

(Continued)

*Primary Examiner* — Michael Leslie
(74) *Attorney, Agent, or Firm* — Fish & Richardson P.C.

(57) ABSTRACT

A system includes a collection of water at a first elevation, an aquifer at a second elevation lower than the first elevation and one or more fluid communication channels that facilitate fluid communication between the collection of water and the aquifer. A turbine-generator is in one of the fluid communication channels to convert kinetic energy of fluid that has flown out of the collection of water into electrical energy. A fluid collection area is downstream of the turbine-generator that at least temporarily collects fluid that has passed through the turbine-generator. An injection pump is provided to pump fluid that has accumulated in the collection area into the aquifer.

22 Claims, 10 Drawing Sheets

FOREIGN PATENT DOCUMENTS

| | | |
|---|---|---|
| JP | 11-223176 | 8/1999 |
| JP | 11-223177 | 8/1999 |

OTHER PUBLICATIONS

Non-final Office Action dated Nov. 24, 2009, corresponding to U.S. Appl. No. 12/035,012, filed Feb. 21, 2008.

ENERGY FROM SUBTERRANEAN RESERVOIR FLUID

FIELD OF THE INVENTION

This invention relates to capturing energy by using subterranean reservoir fluid, such as aquifer fluid, fluid passing through a fractured hot dry rock or fluid passing through a fractured hot wet rock formation.

BACKGROUND

Fluids, such as water, are used in connection with various domestic and industrial applications. As an example, water is used to cool and act as a heat sink for a variety of machinery and in connection with many different industrial processes. As another example, hot water is used to heat buildings and houses.

Aquifers are permeable bodies of rock capable of yielding quantities of water, for example, to wells or springs. Hot dry rock formations are geothermal resources that include subsurface rock structures heated by geothermal energy. Hot wet rock formations are geothermal resources that include subsurface rock structures that contain some moisture or fluid and that are heated by geothermal energy.

SUMMARY OF THE INVENTION

Systems and methods are disclosed that utilize thermal and kinetic energy of fluid flowing into and out of a subterranean reservoir, such as an aquifer, a fractured hot dry rock formation or a fractured wet rock formation. In certain instances, an injection pump is provided to facilitate fluid injection into the subterranean reservoir.

In one aspect, a method includes monitoring demand on an electrical supply system. If the monitored demand exceeds a predetermined first value, the method includes enabling fluid to flow substantially under the influence of gravity from a first elevation through a turbine-generator. In the turbine-generator, kinetic energy associated with the flowing fluid is converted into electrical energy. A portion of the fluid that passes through the turbine-generator is collected in a collection area downstream of the turbine generator. The collected fluid is pumped from the collection area into a subterranean reservoir with an injection pump. If the monitored demand on the electrical power system drops below a predetermined second value, fluid is moved, by a pump for example, from the subterranean reservoir to the first elevation.

In a typical implementation, the injection pump is located between the turbine-generator and the subterranean reservoir relative to the fluid's flow path.

Certain embodiments of the method include sensing a fluid level within the collection area downstream of the turbine-generator and controlling the injection pump's operation based on the sensed fluid level. Certain embodiments of the method include sensing a pressure associated with the collected fluid in the collection area downstream of the turbine-generator and controlling the injection pump's operation based on the sensed pressure.

The subterranean reservoir can be an aquifer, a fractured hot dry rock formation or a fractured hot wet rock formation. The first elevation typically is higher than the subterranean reservoir.

In another aspect, a system includes a collection of water at a first elevation and a subterranean reservoir at a second elevation lower than the first elevation. One or more fluid communication channels facilitate fluid communication between the water collection at the first elevation and the subterranean reservoir. A turbine-generator creates electrical energy from the kinetic energy of flowing fluid between the water collection and the subterranean reservoir inside one of the fluid communication channels. A fluid collection area is downstream of the turbine-generator and at least temporarily collects the fluid that has passed through the turbine-generator. An injection pump moves the fluid accumulated in the collection area into the subterranean reservoir.

In some implementations, the system includes a fluid level sensor to sense a fluid level in the collection area and a controller to control the injection pump's operation based on the fluid level sensed by the fluid level sensor. In some implementations, the system includes a pressure sensor to sense a pressure associated with the fluid collected in the collection area, wherein the sensed pressure provides an indication of fluid level in the collection area, and a controller to control the injection pump's operation based on the pressure sensed by the pressure sensor.

The injection pump typically is located between the turbine-generator and the subterranean reservoir relative to a flow path of the fluid. The subterranean reservoir may be an aquifer, a fractured hot dry rock formation or a fractured hot wet rock formation.

Certain embodiments include a pump to move fluid from the subterranean reservoir up to the water collection at the first elevation.

In yet another aspect, a method includes moving fluid from a subterranean reservoir to an elevation above the subterranean reservoir. The fluid is used at the higher elevation for a domestic or industrial application. After using the fluid for the domestic or industrial application, the method includes enabling the fluid to flow from the higher elevation through a turbine-generator substantially under the influence of gravity and converting the flowing fluid's kinetic energy into electrical energy with the turbine-generator. The fluid that has passed through the turbine-generator is collected at a collection area downstream of the turbine-generator. Fluid is pumped from the collection area into the subterranean reservoir with an injection pump. In a typical implementation, the injection pump is located between the turbine-generator and the aquifer relative to a flow path of the fluid.

According to certain embodiments, the method includes sensing a fluid level within the collection area and controlling the injection pump's operation based on the sensed fluid level. According to certain embodiments, the method includes sensing a pressure associated with the fluid in the collection area and controlling the injection pump's operation based on the sensed pressure.

The subterranean reservoir may be an aquifer, a fractured hot dry rock formation or a fractured hot wet rock formation. In some implementations, the fluid is moved from the subterranean reservoir to the higher elevation through a first fluid communication channel and is returned to the subterranean reservoir through a second fluid communication channel.

In still another aspect, a method includes monitoring demand on an electrical supply system. If the monitored demand exceeds a predetermined first value, the method includes enabling fluid to flow substantially under the influence of gravity from a first elevation that is higher than a subterranean reservoir through a turbine-generator. The kinetic energy associated with the flowing fluid is converted into electrical energy at the turbine-generator. Fluid is collected in a collection area at an elevation lower than the turbine-generator and is pumped from the collection area into the subterranean reservoir. If the monitored demand drops below a predetermined second value, the method includes moving fluid from the subterranean reservoir to the first, higher elevation. When the fluid is at or near the first, higher elevation, the fluid is used in connection with a domestic or industrial application.

In some implementations, one or more of the following advantages are present.

For example, the techniques and systems described herein enable the production and utilization of energy in an environmentally-friendly manner. Indeed, since typical implementations operate on hydropower and thermal energy principles, the emission of potentially harmful gases is minimal. Additionally, natural resources are utilized to create hydroelectric pumped-storage facilities or other energy systems at a relatively low cost. Accordingly, energy may be produced and provided to end users at a more affordable rate. Peak electrical demand required of an electrical power system may be satisfied in a highly efficient manner.

Natural resources may be utilized to store and supply electricity in an efficient manner.

Moreover, abundant supplies of fluid (from one or more aquifers) may be accessed and used for cooling and/or heating in connection with a variety of domestic and industrial processes in a cost-effective manner.

Other features and advantages will be apparent from the description and drawings, and from the claims.

DETAILED DESCRIPTION

Figure 1:
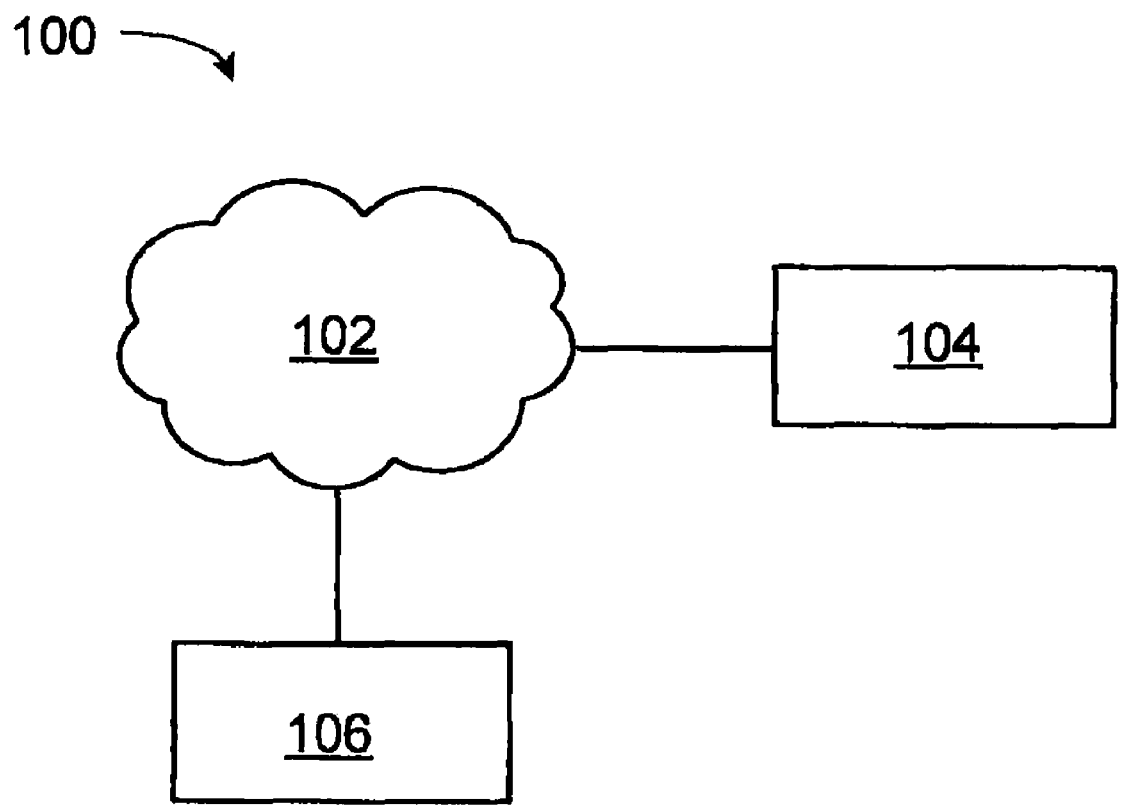
FIG. 1 is a schematic view of an electrical power system.

The electrical power system 100 of FIG. 1 includes a primary electrical system 102 operable to supply electricity to an electrical load 104. A hydroelectric pumped-storage facility 106 is operable to store and/or to produce energy by moving fluid (e.g., water) between two or more subterranean reservoirs (e.g., aquifers or fractured hot dry rock formations) or between a subterranean reservoir and some other body of fluid or device. The energy produced by the hydroelectric pumped-storage facility may be used to supplement the energy provided by the primary electrical system 102 particularly during periods of relatively high demand.

In a typical implementation, the primary electrical system 102 includes one or more electrical generating stations, a variety of electrical transmission and distribution equipment. The capacity of the electrical supply system 102 to supply energy to the electrical load 104 is finite. The demand associated with the electrical load 104 may vary considerably over time and may, in some instances, exceed the generating capacity of the electrical supply system.

When the demand on the primary electrical system 102 is relatively low, the hydroelectric pumped-storage facility 106 can use electricity generated by the primary electrical system 102 to move fluid, for example, from one aquifer to another aquifer (or other body of fluid) at a higher elevation. On the other hand, when demand on the primary electrical system 102 is relatively high, the hydroelectric pumped-storage facility 106 can release fluid from the higher elevation so that it flows, substantially under the influence of gravity, from the higher elevation, through a turbine-generator. The turbine-generator converts the kinetic energy of the flowing fluid into electricity, which may be used to supplement the finite capacity of the electrical supply system 102 and help satisfy the demand required by the electrical load 104. After flowing through the turbine generator, the fluid returns to the lower aquifer.

Figure 2:
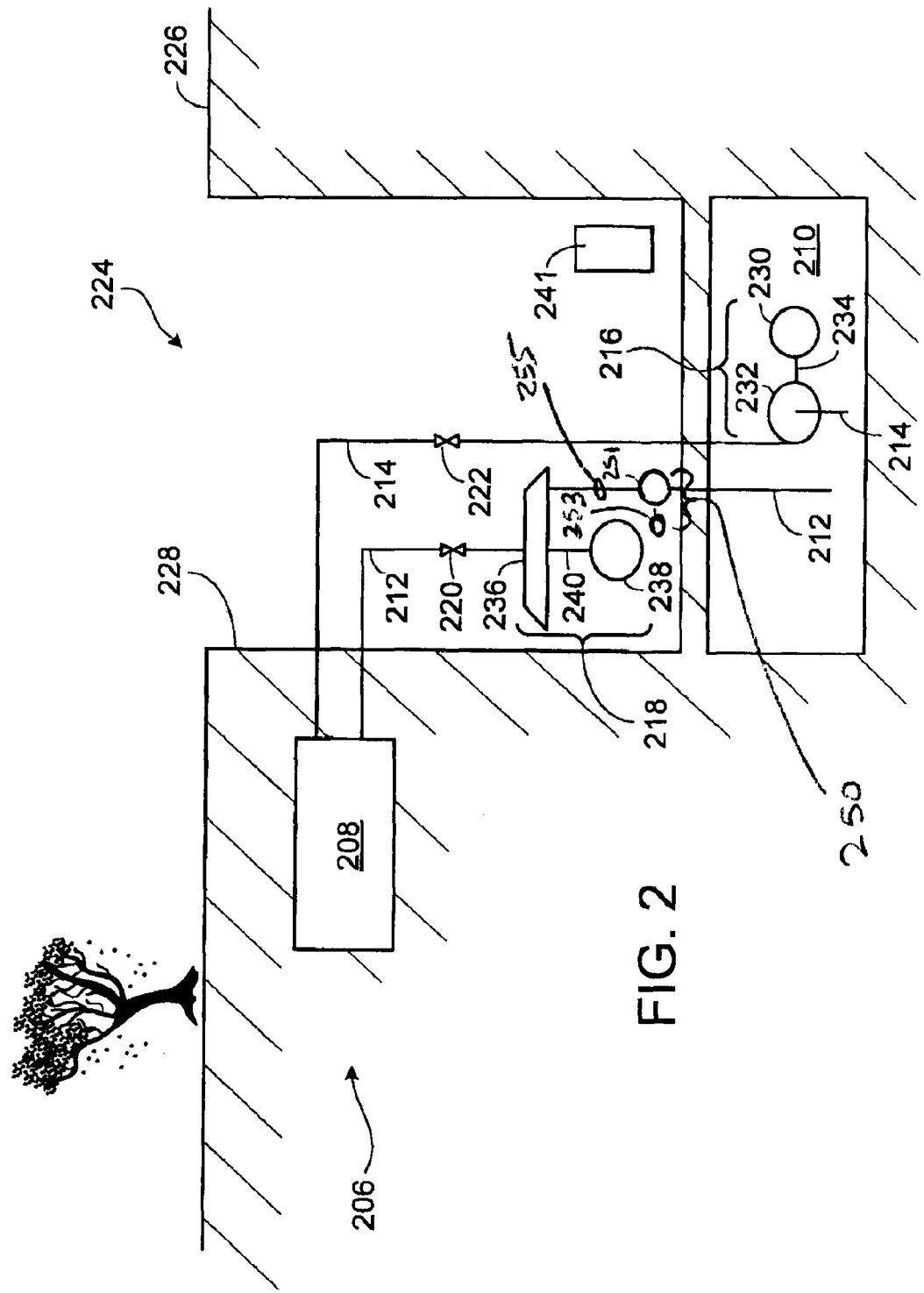
FIG. 2 is a cross-sectional view showing one implementation of a hydroelectric pumped-storage facility.

As shown in FIG. 2, hydroelectric pumped-storage facility 206 includes a first aquifer (i.e., upper aquifer 208) at a first elevation and a second aquifer (i.e., lower aquifer 210) at a second elevation lower than the first elevation. First 212 and second 214 fluid communication channels extend between the upper 208 and lower 210 aquifers. The facility 206 includes a turbine-generator 218 associated with the first fluid communication channel 212 and a pump station 216 associated with the second fluid communication channel 214. Valves 220, 222 are provided in the first 212 and second 214 fluid communication channels respectively and are operable to restrict and/or enable fluid flow through those channels. An injection pump 250 is in the first fluid communication channel 212 beneath and downstream of the turbine-generator 218. The facility 206 also includes a controller 241 to control various aspects of the facility's 206 operations.

In the illustrated implementation, several of the illustrated components are positioned in a bore hole 224 that extends from the earth's surface vertically downward to a surface just above the lower aquifer 210. The bore hole 224 is formed so that one of its sidewalls 228 is adjacent the upper aquifer 208. In some implementations, the upper aquifer 208 could be located some distance away from the bore hole 224.

The illustrated pump station 216 is positioned inside the lower aquifer 210 and includes a prime mover 230 (e.g., a motor) coupled to a pump 232 via a shaft 234. The motor 230 provides the power to operate the pump.

In some implementations, it is desirable that the pump 232 be located as low as possible, and preferably, be below the expected static fluid line of the lower aquifer 210. Locating the pump 232 as low as possible helps to ensure that a positive pressure will exist at the pump's 232 inlet.

In the illustrated implementation, the pump 232 is operable to move fluid from the lower aquifer 210 to the upper aquifer 208. In some implementations, the pump 230 is a rotodynamic pump (e.g., a centrifugal pump). In other implementations, however, the pump 230 is a positive displacement pump (e.g., a reciprocating pump).

The pump's 232 suction line takes suction from the lower aquifer 210. It is generally preferable that the suction line extend as low as practical in the bottom of the lower aquifer 210 so that the pump will be able to continue moving fluid out of the lower aquifer 210 even if there is only a small amount of fluid in the lower aquifer 210.

The pump's 232 discharge line extends upward from the pump 232, curving to pass through the side wall 228 of the bore hole 224 and into the upper aquifer 208. It is generally preferable that the pump's 232 discharge line enter the upper aquifer 208 at a relatively high part of the aquifer 208. If the pump's 232 discharge line enters the upper aquifer 208 above the expected fluid line in the upper aquifer 208, then a minimal amount of fluid will be available to flow back down through the second fluid communication channel 214 if the pump 216 is turned off.

The valve 222 coupled to the pump's 232 discharge line is operable to restrict and/or enable fluid flow through the discharge line. Typically the valve 222 will be open when the pump 232 is operating and will be closed when the pump 232 is not operating. In some implementations, the valve 222 may be adapted to open and close automatically. It is generally desirable to close the valve 222 when the pump 232 is not operating so as to prevent undesirable backflow from the upper aquifer 208 to the lower aquifer 210.

In the illustrated implementation, the turbine-generator 218 is positioned inside the bore hole 208 and includes a turbine 236, and a generator 238 operatively coupled to the turbine 236 via a shaft 240. The turbine-generator 218 is arranged so that fluid can flow out of the first (i.e., upper) aquifer 208 and through the turbine-generator 218 substantially under the influence of gravity. The flowing fluid causes the turbine 236 and, therefore, the generator 238 to rotate. Rotation of the generator 238 enables the generator 238 to generate electricity.

The lower aquifer 210 has finite permeability (i.e., finite ability to accommodate fluid flowing into it). The lower aquifer 210 generally presents some resistance to fluid trying to enter it from the bottom of the first fluid communication channel 212. Depending on the degree of resistance and the volume of fluid flowing through the channel, a back-up of fluid in a collection area at the bottom of the first fluid communication channel 212 may occur. If the fluid were allowed to back-up to a level that approaches the turbine 236, then fluid flow through the turbine 236 and the turbine's operation itself might be compromised. Accordingly, in a typical implementation, the turbine-generator 218 is positioned high enough above the lower aquifer 210 to ensure that even if some back-up fluid accumulates in the collection area at the bottom of the first fluid communication channel 212, a sufficient amount of fluid flow is maintained through the turbine to ensure continued operation of the turbine 236.

In some implementations, such as the one illustrated in FIG. 2, an injection pump assembly 250 is provided to help urge fluid that collects at the bottom of the first fluid communication chamber 212 into the lower aquifer 210. Fluid collection may occur if, for example, the lower aquifer is not permeable enough to accommodate all of the fluid flowing through the turbine generator.

In the illustrated implementation, an injection pump assembly 250 is located between the turbine-generator 218 and the lower aquifer 210. The illustrated injection pump assembly 250 includes a pump 251 and a prime mover 253, such as an electric motor or engine, which drives the pump 251.

It is generally preferred that the injection pump assembly 250 be arranged and designed to maximize its ability to urge fluid into the lower aquifer 210. In some implementations, the injection pump assembly 205 is positioned at the lowest reasonable elevation so that it can help urge the collected fluid into the lower aquifer 210 even when very little fluid has collected in the collection area downstream of the turbine-generator.

Additionally, in some implementations, a sensor 255 is provided to sense the presence of or pressure associated with the fluid accumulated in the collection area. In such implementations, the controller 241 may be adapted to control the injection pump assembly 250 automatically so that it turns on and off automatically based on either the fluid level or fluid pressure in the collection area. So, for example, in one implementation, the injection pump assembly 250 would turn on only when the fluid level in the first fluid communication channel is above the injection pump assembly 250. Once the fluid level dropped to below the injection pump assembly 250, the injection pump assembly 250 would be turned off.

Although the injection pump assembly 250 in FIG. 2 is positioned above the lower aquifer 210, in some implementations, it may be positioned at the same elevation as and on the side of the lower aquifer 210. In some embodiments, the injection pump assembly 250 could be positioned at a lower elevation than the lower aquifer 210. Regardless of its position relative to the lower aquifer 210, the injection pump assembly 250 should be arranged so as to urge fluid that has passed through the turbine-generator 218 into the lower aquifer to help overcome resistance to fluid flow that may be inherent in the lower aquifer 210.

In some implementations, the turbine's 236 inlet line extends through the side wall 228 of the bore hole 224 and into the upper aquifer 208. In some respects, it may be desirable for the turbine's inlet line enter the upper aquifer 208 as low as possible in the upper aquifer 208 so that a supply of fluid from the aquifer 208 is available even if there is not much fluid in the aquifer 208. On the other hand, if the turbine's 236 inlet line enters the upper aquifer 208 at a higher point in the aquifer 208, then the pressure head forcing fluid down through the turbine 236 may be greater, which also may be considered desirable. The turbine's outlet line extends through the bottom of the bore hole 224 and into the lower aquifer 210.

The valve 220 coupled to the turbine's 236 inlet line is operable to control fluid flow into the turbine 236. When the valve 220 is open, fluid is allowed to flow substantially under the influence of gravity into and through the turbine 236. When the valve 220 is closed, fluid is prevented from flowing into the turbine 236. In some implementations, the controller 241 is adapted to throttle the valve 220 automatically.

In general, the illustrated hydroelectric pumped-storage facility 206 may operate to provide supplemental energy to a primary electrical system (e.g., primary electrical system 102 of FIG. 1) as follows. When demand on the system 102 is low (i.e., when it drops below a predetermined first value), the pump 232 begins to operate and the valve 222 in the pump outlet line opens. While operating, the pump 232 moves fluid from the lower aquifer 210 to the higher aquifer 208. In some implementations, once started, the pump 232 operates for a predetermined duration. During that time, the pump 232 typically moves fluid from the lower aquifer to the upper aquifer.

Pump 232 operation may be controlled in a number of other ways. For example, level sensors in the upper 208 and lower 210 aquifers may be used to determine when operation of pump 232 should be stopped. Alternatively, fluid pressure gages may be used to determine when operation of the pump 232 should be stopped.

Once the pump 232 is stopped, the valve 222 closes to prevent undesirable backflow of fluid through the pump 232.

When demand on the electrical supply system is high (i.e., it exceeds a predetermined second value), valve 220 may be opened to enable fluid to flow through fluid communication channel 212 substantially under the influence of gravity. The flowing fluid passes through the turbine 236 portion of the turbine-generator 218 substantially under the influence of gravity, which essentially converts the fluid's kinetic energy into electrical energy. That electrical energy may be fed from the generator 238 portion of the turbine-generator 218 into a primary electrical system to help satisfy the demand on that system.

After passing through the turbine-generator 218, the fluid continues to flow downward through the first fluid communication channel 212 to a collection chamber that comprises a bottom section of the first fluid communication channel 212 where the injection pump assembly 250 is located.

In some implementations, the system is operable so that fluid continues flowing through the first fluid communication channel 212 until the demand on the electrical supply system drops below a predetermined value. If the demand does not drop below the predetermined value, then the fluid may continue to flow until there is not enough fluid left in the upper aquifer 208 to continue running the turbine-generator 218, or until the lower aquifer 210 is substantially full.

To stop the turbine-generator 218 from operating, the valve 220 can be closed, which stops the flow of fluid through the first fluid communication channel 212 and, therefore, through the turbine-generator 218. Once the flow of fluid has ceased, the turbine-generator ceases operating. At that point, if there still is fluid accumulated at the bottom of the first fluid communication channel waiting to enter the lower aquifer 210, then the injection pump assembly 250 may continue to operate until the accumulated fluid has at least partially or substantially dissipated into the lower aquifer 210.

Various aspects of the facility's operations may be implemented manually or, alternatively, may be automated, for example, via the controller 241.

Figure 3:
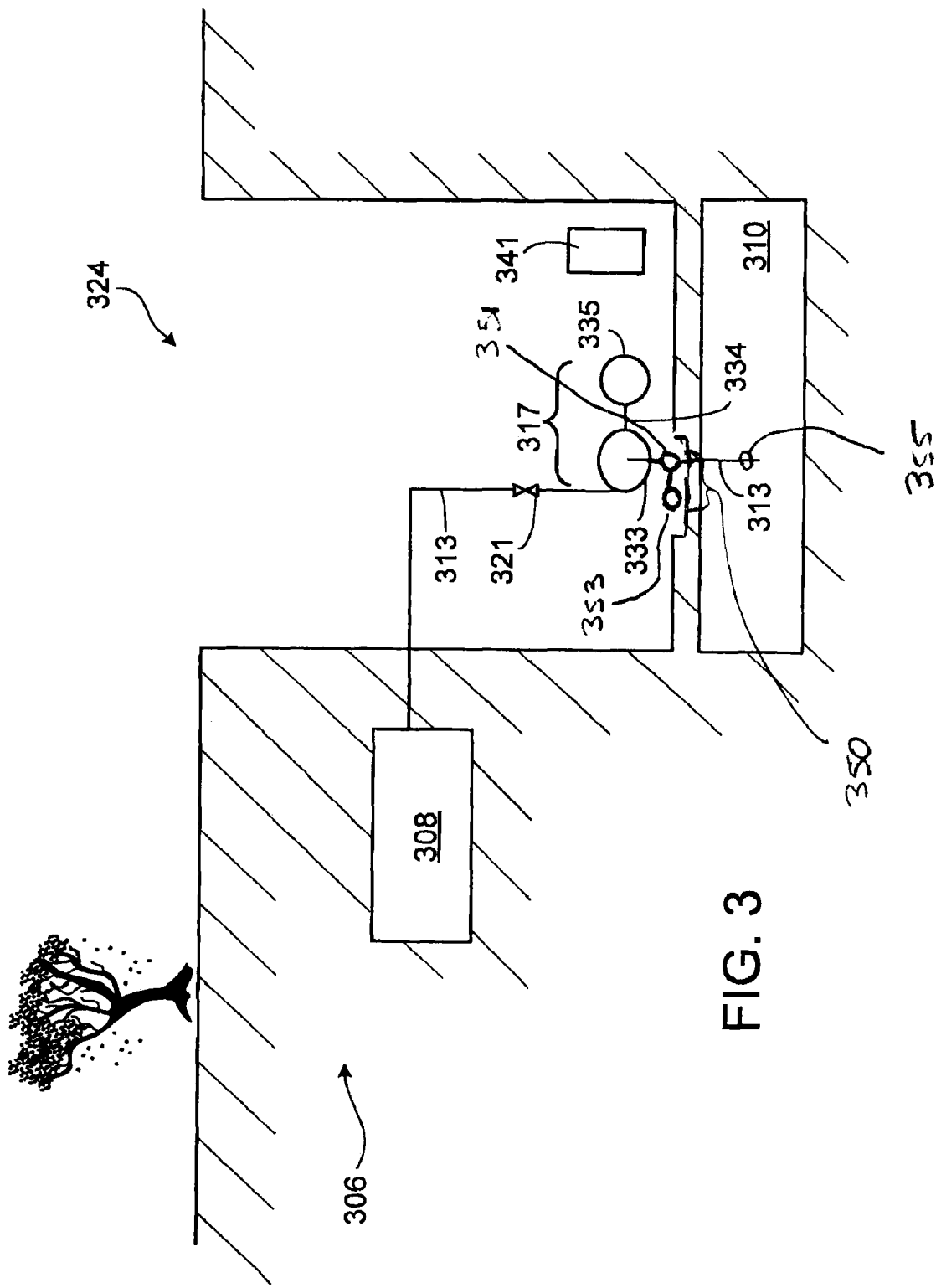
FIG. 3 is a cross-sectional view showing another implementation of a hydroelectric pumped-storage facility.

FIG. 3 illustrates another implementation of a hydroelectric pumped-storage facility 306. Other than a few differences discussed below, the illustrated facility 306 is similar to the facility 206 of FIG. 2.

The illustrated facility 306 includes an upper aquifer 308 at a first elevation and a lower aquifer 310 at a second elevation lower than the first elevation. A fluid communication channel 313 extends between the upper 308 and lower 310 aquifers. A reversible pump-turbine station 317 is associated with the fluid communication channel 313. A valve 321 is provided to restrict and/or enable fluid flow through the fluid communication channel 313. A controller 341 is provided, which is operable to control various aspects of the facility's 306 operations.

The reversible pump-turbine station 317 is positioned in the bore hole 324. The reversible pump-turbine station 317 may be positioned a sufficient height above the lower aquifer 310 to avoid problems associated with fluid back-up at the bottom of the fluid communication channel 313. The illustrated reversible pump-turbine station 317 includes a reversible pump-turbine 333 coupled to a reversible electric motor/generator 335 via a shaft 334.

The reversible pump-turbine 333 can be operated in one direction as a pump and in the other direction as a turbine. When operated as a pump, the reversible pump-turbine 333 is generally operable to move fluid from the lower aquifer 210 to the upper aquifer 208. When operated as a turbine, fluid flows from the upper aquifer 308 to the lower aquifer 310 substantially under the influence of gravity and turns the reversible pump-turbine 333.

The reversible electric motor/generator 335 can be operated as a motor to drive the pump or can be operated by the turbine as a generator to produce electricity. When the reversible electric motor/generator 335 is operated as a motor, it generally receives electrical energy from an external electrical source, such as the primary electrical system 102 shown in FIG. 1, and operates the reversible pump-turbine 333 as a pump. When the reversible electric motor/generator 335 is turned by the turbine, it acts as a generator and generates electricity.

Since the illustrated reversible pump-turbine 333 may be positioned above the static fluid line of the lower aquifer 310, some implementations include a means for priming (not shown) the reversible pump-turbine 333 may be provided. In general, the means for priming would be adapted to substantially fill the pump-turbine's casing with fluid prior to it starting to operate in pump-mode. In some implementations, the priming means is a vacuum pump or an air ejector.

In some implementations, the reversible pump-turbine may be adapted for self-priming when it begins operating in pump-mode. Alternatively, a foot or check valve may be used to retain liquid within the pump's suction line. In some implementations, a separate, submersible priming pump may be positioned in the lower aquifer and be operable to prime the reversible pump-turbine when it is going to be operated in pump-mode.

An optional injection pump assembly 350, which includes a pump 351 and a prime mover 353, is provided at an elevation below the reversible pump-turbine 333 and is coupled to the fluid communication channel so that it can help urge fluid accumulated at the bottom of the fluid communication channel 313 into the lower aquifer 310.

A sensor 355 is provided to sense the fluid level or pressure in the collection area at the bottom of the fluid communication channel. The controller 341 may be adapted to control the injection pump's operation based on the sensed fluid level or pressure.

Figure 4:
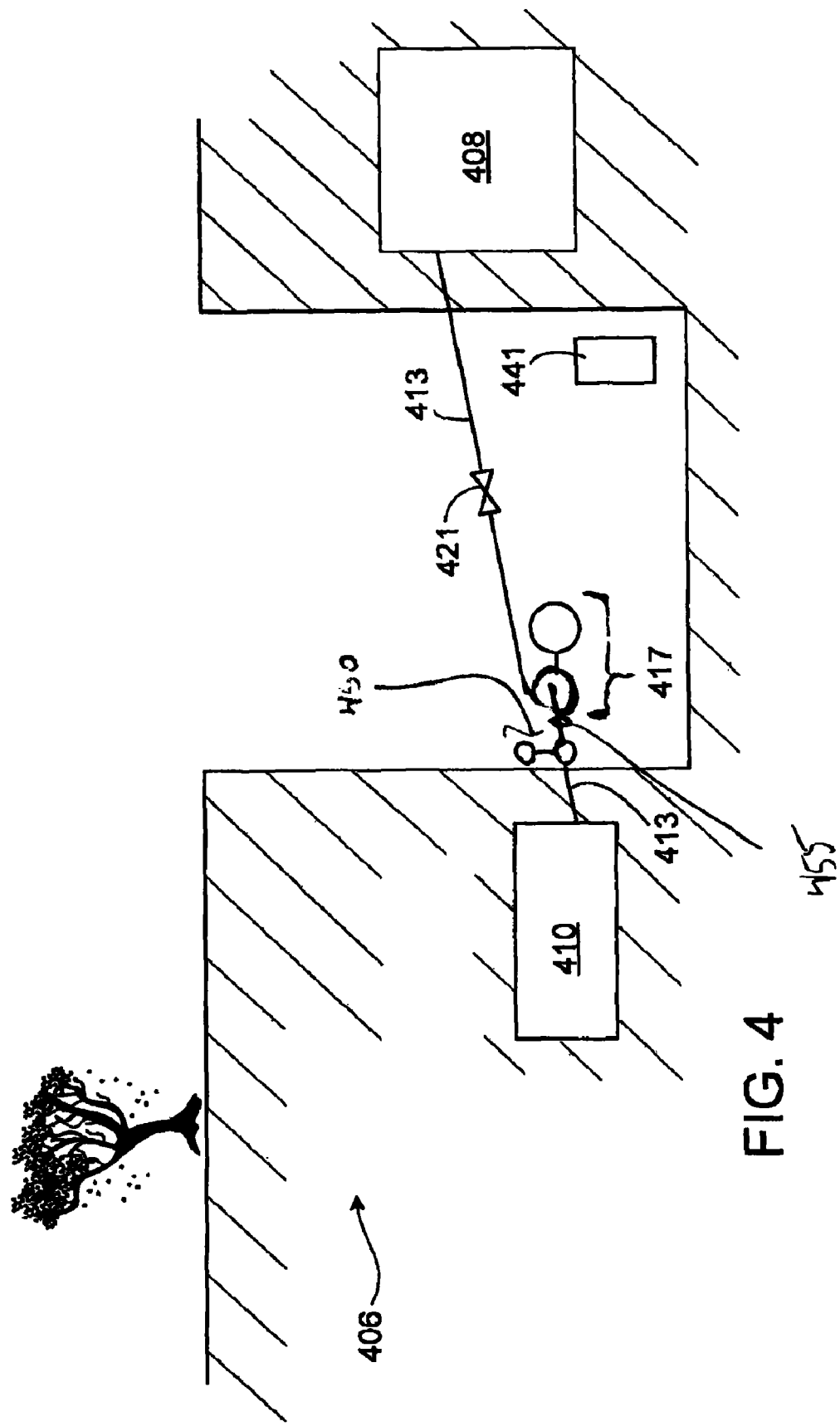
FIG. 4 is a cross-sectional view of yet another implementation of a hydroelectric pumped-storage facility.

FIG. 4 illustrates yet another implementation of a hydroelectric pumped-storage facility 406. Other than a few differences discussed below, the illustrated facility 406 is similar to the facilities 206, 306 in FIGS. 2 and 3.

The illustrated facility 406 includes a first aquifer 408 and a second aquifer 410, portions of which are at the same elevation as one another. A fluid communication channel 413 extends between an upper portion of the first aquifer 408 and a lower portion of the second aquifer 410. A reversible pump-turbine station 417 is associated with the fluid communication channel 413. A valve 421 is provided in the fluid communication channel 413 and is operable to restrict and/or enable fluid flow through the fluid communication channel 413. A controller 441 is operable to control various aspects of the facility's 406 operations.

The illustrated bore hole 424 extends from the earth's surface in a downward direction between the two aquifers 408, 410.

The fluid communication channel 413 enters the first aquifer 408 at a first elevation and enters the second aquifer 410 at a second elevation that is lower than the first elevation. The fluid communication channel 413, therefore, is angled so that fluid can flow substantially under the influence of gravity from the first aquifer 408 to the second aquifer 410 when the valve 421 is open. When fluid flows in that manner, the reversible pump-turbine station 417 is operated in turbine-mode. When, on the other hand, the reversible pump-turbine station 417 is operating in pump-mode and the valve 421 is open, fluid is moved by the pump from the second aquifer 410 to the first aquifer 408 through the fluid communication channel 413.

In the illustrated implementation, an injection pump 450 is coupled to the fluid communication channel 413. The injection pump 450 is between the reversible pump-turbine station and the second aquifer 410 and is arranged to help urge fluid into the second aquifer 410. As discussed above, this may be desirable, for example, if the second aquifer's 410 permeability is particularly low.

In the illustrated implementation, the system 406 includes a sensor 455 to sense fluid level and/or pressure in the fluid collection area downstream of the reversible pump-turbine 417. The controller 441 is adapted to control the injection pump's 450 operation based on the sensed pressure and/or fluid level.

Figure 5:
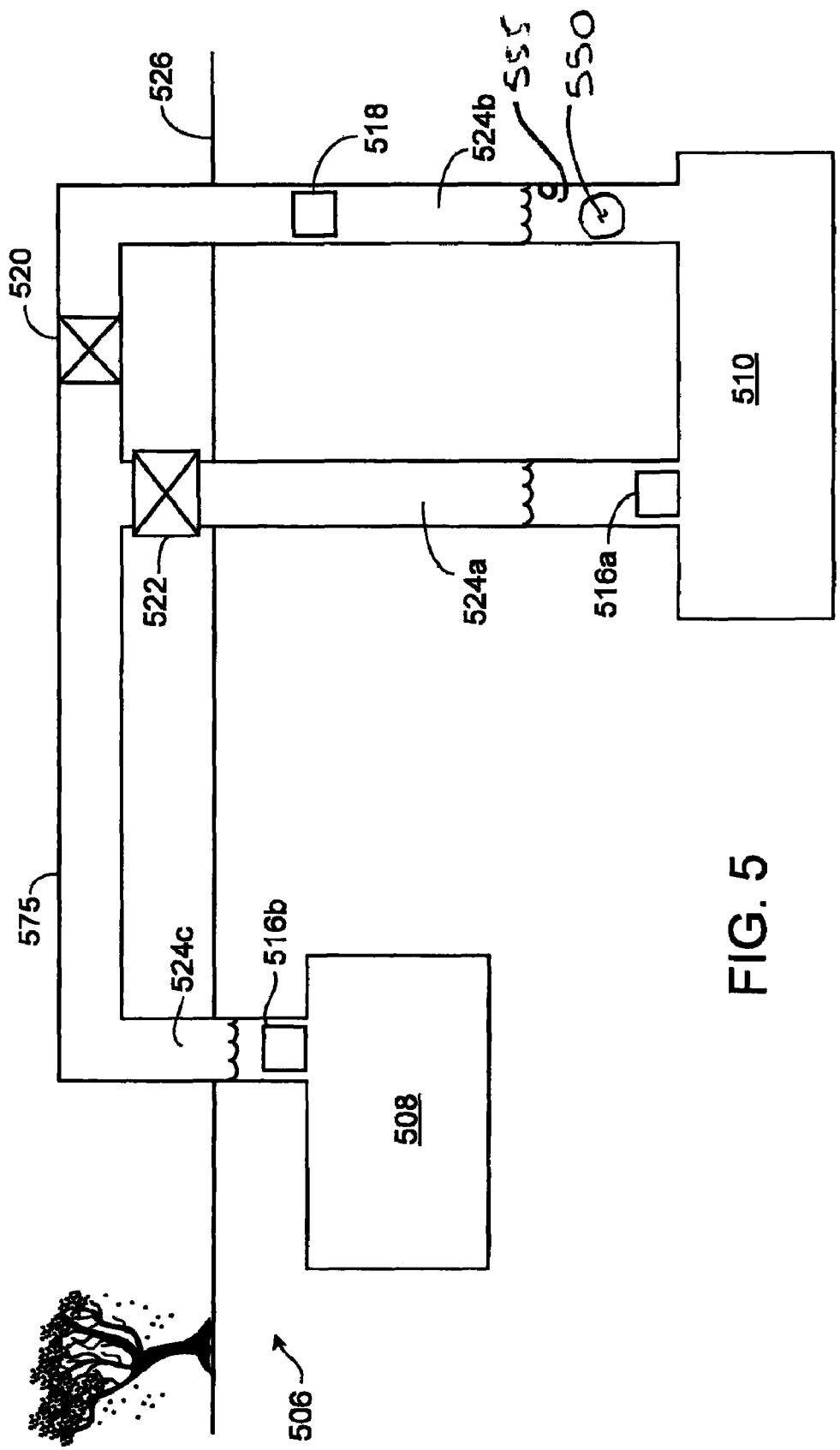
FIG. 5 is a cross-sectional view of still another implementation of a hydroelectric pumped-storage facility.

FIG. 5 illustrates yet another implementation of a hydroelectric pumped-storage facility 506. Other than a few differences discussed below, the illustrated facility 506 is similar to the facility 206 in FIG. 2.

The illustrated facility 506 includes a includes a first aquifer (i.e., upper aquifer 508) at a first elevation, a second aquifer (i.e., lower aquifer 510) at a second elevation lower than the first elevation. Fluid communication channels extend between the upper 508 and lower 510 aquifers. The fluid communication channels are defined by a pair of bore holes 524a, 524b that extend from the lower aquifer 510 to the earth's surface, a bore hole 524c that extends from the upper aquifer 508 to the earth's surface 526 and a network of pipes 575 that provide fluid communication between the bore holes 524a, 524b, 524c. The pipes include valves 520, 522.

A turbine-generator 518 is positioned inside one of the bore holes 524b that extends from the lower aquifer 510 to the earth's surface 526. In the illustrated implementation, the turbine-generator is above the static fluid line of the lower aquifer 510. However, in some implementations, the turbine-generator 518 can be at or beneath the static fluid level of the lower aquifer 510.

A first pump station 516a is positioned inside the other bore hole 524a that extends from the lower aquifer 510 to the earth's surface 526. That pump station 516a is beneath the static fluid line of the lower aquifer 510 and is operable to move fluid from the lower aquifer 510 to the upper aquifer 508. A second pump station 516b is positioned inside the bore hole 524c that extends from the upper aquifer 508 to the earth's surface 526. The second pump station 516b is beneath the static fluid line of the upper aquifer 508 and is operable to move fluid from the upper aquifer into the above-ground pipe 575 so that the fluid can flow, at least partially under the influence of gravity, down to the lower aquifer 510.

An injection pump 550 is positioned in bore hole 524b and is arranged to help urge fluid accumulated at the bottom of the bore hole 524b into the lower aquifer 510. In some implementations, the injection pump 550 helps avoid a build-up of accumulated water in bore hole 524b to the turbine-generator 518.

In the illustrated implementation, a sensor 555 is provided in a fluid collection area of the bore hole 524b downstream of the turbine-generator 518. The sensor 555 may be adapted to sense the fluid level or fluid pressure in the collection area so that the injection pump 550 can be turned on and off automatically based on the sensed fluid level or pressure.

In general, the illustrated hydroelectric pumped-storage facility 506 may operate to provide supplemental energy to a primary electrical system (e.g., primary electrical system 102 of FIG. 1) as follows. When demand on the system 102 is low (i.e., when it drops below a predetermined first value), the pump 516a begins to operate and the valve 522 in the pump outlet line opens. While operating, the pump 532 moves fluid from the lower aquifer 510 to the higher aquifer 508. When the pump 532 is stopped, the valve 522 closes.

When demand on the electrical supply system is high (i.e., it exceeds a predetermined second value), valve 520 may be opened to enable fluid to flow through bore hole 524b at least partially under the influence of gravity. Pump 516b may be operated to move fluid from the upper aquifer 508 into the above-ground pipes 575. The fluid flowing through the bore hole 524b passes through the turbine-generator 518 substantially under the influence of gravity, which essentially converts the fluid's kinetic energy into electrical energy. That electrical energy may be fed from the turbine-generator 518 into the primary electrical system to help satisfy the demand on that system.

The fluid that has passed through the turbine-generator 518 collects in a collection chamber at the bottom of bore hole 524b. The collected fluid flows into the lower aquifer 510 at a rate that depends, at least partially, on the lower aquifer's 510 permeability, and the fluid pressure produced by the injection pump 550.

Figure 6:
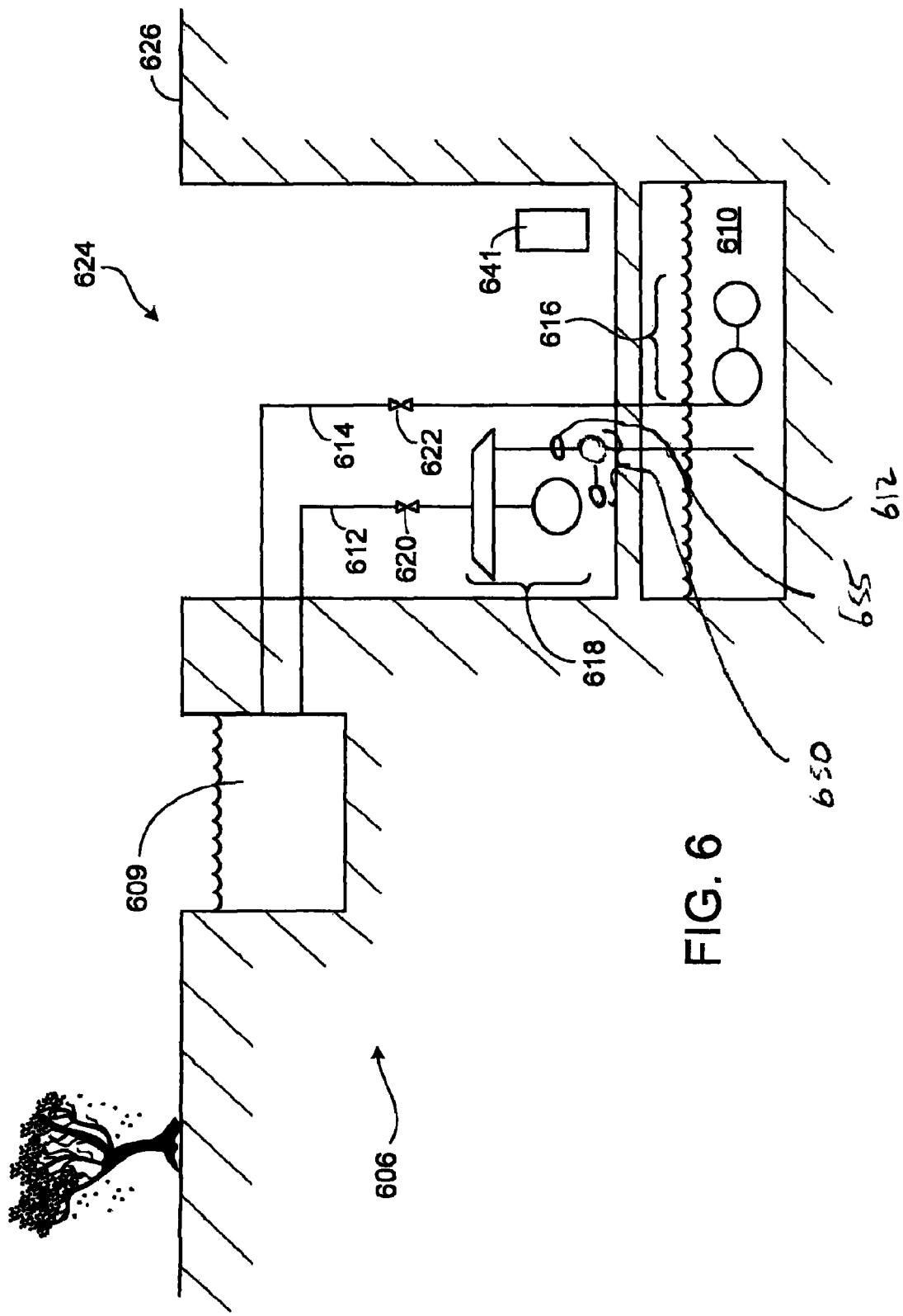
FIG. 6 is a cross-sectional view of another implementation of a hydroelectric pumped-storage facility.

FIG. 6 is yet another implementation of a hydroelectric pumped-storage facility 606. Other than a few differences discussed below, the illustrated facility 606 is similar to the facility 206 in FIG. 2.

The illustrated facility 606 includes a first source of water (e.g., reservoir 609) exposed at the earth's surface 626 and an aquifer 610 at an elevation below the earth's surface 626. First 612 and second 614 fluid communication channels extend between the reservoir 609 and the aquifer 610. The facility 606 includes a turbine-generator 618 associated with the first fluid communication channel 612 and a pump station 616 associated with the second fluid communication channel 614. Valves 620, 622 are provided in the first 612 and second 614 fluid communication channels respectively and are operable to restrict and/or enable fluid flow through those channels. An injection pump assembly 650 is provided at a lower elevation The facility 606 also includes a controller 641 that may be operable to control various aspects of the facility's 606 operations. A bore hole 624 extends from the earth's surface vertically downward to a surface just above the lower aquifer 210. A sensor 655 is provided to sense the fluid level or pressure in a fluid collection area of the channel 612 so that the injection pump's 650 operation can be automated based on the sensed level or pressure.

Operation of the facility 606 is similar to operation of the facility 206 of FIG. 2, which is discussed above.

In some implementations, the first source of water may be a lake, a river, an ocean, a stream, a man-made tank or any other source of water that may be exposed at or near the earth's surface.

Figure 7:
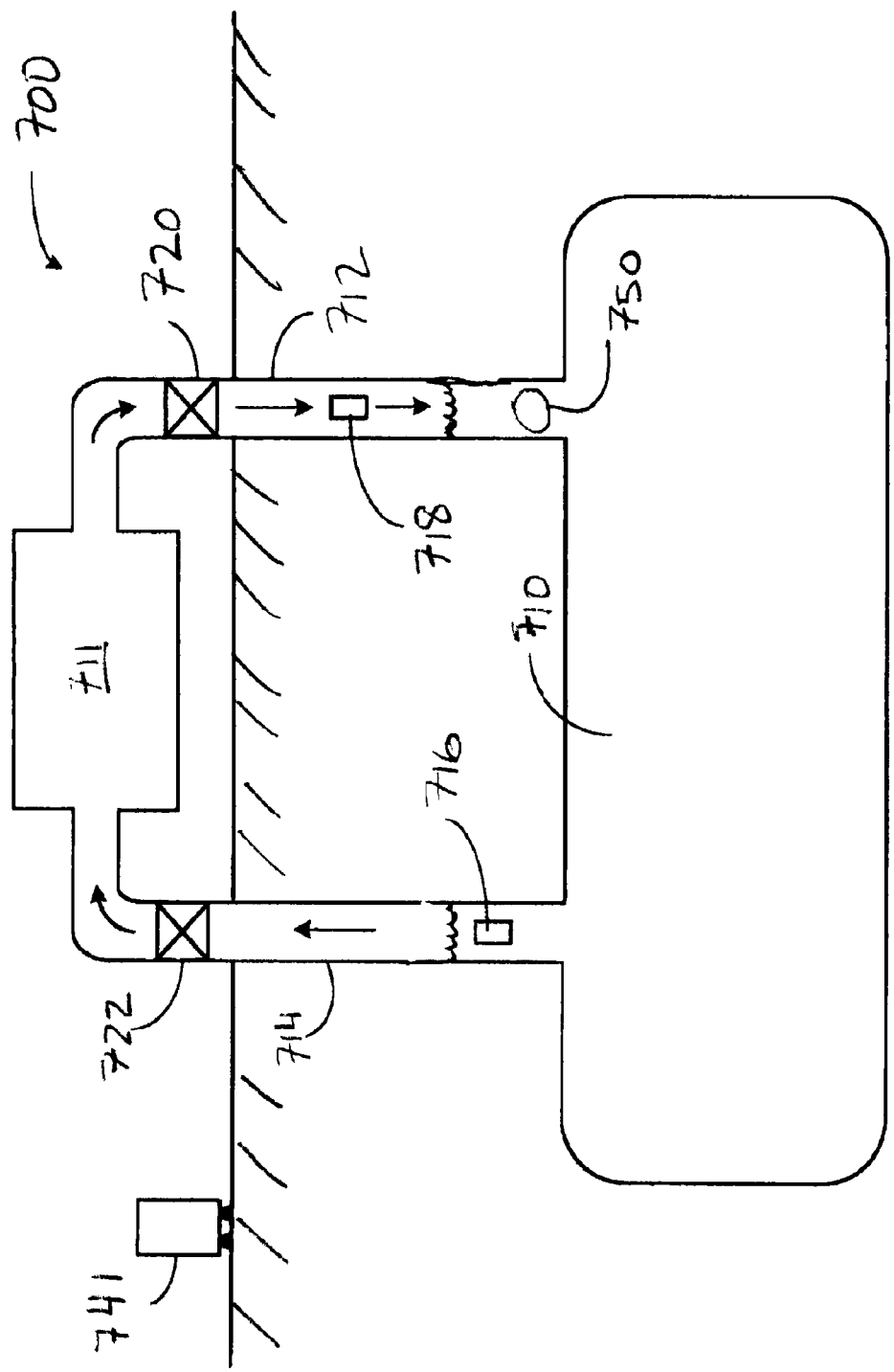
FIG. 7 is a cross-sectional view showing one implementation of a system for accessing fluid for use in connection with domestic or industrial applications.

The system 700 of FIG. 7 enables fluid to be accessed from a subterranean aquifer 710 and used in connection with a domestic or industrial application in a cost-efficient manner.

A first 712 and second 714 fluid communication channels extend between the aquifer 710 and a heat exchanger 711 at an elevation above the aquifer 710. In the illustrated implementation, the heat exchanger 711 is located just above the earth's surface. A pump 716 is provided inside the second fluid communication channel 714 and is arranged to move fluid from the aquifer 710 to the heat exchanger 711. The illustrated implementation indicates that the aquifer fluid is delivered to a heat exchanger 106. In other implementations, however, the aquifer fluid can be delivered to any means for using the aquifer fluid in a domestic or industrial application. Such means can include components or groups of components such as heating system components, air conditioning and refrigeration system components, heat exchangers to cool domestic or industrial equipment and any application that is not likely to compromise the quality of the water returning to the aquifer.

The first fluid communication channel 712 is adapted to accommodate fluid flow from the heat exchanger 711 through a turbine-generator 718 substantially under the influence of gravity. The turbine-generator 718 is arranged to convert kinetic energy of the flowing fluid into electrical energy. The electrical energy generated by the turbine-generator 718 can at least partially offset the energy used by the pump 716 to move fluid from the aquifer 710 to the heat exchanger 711.

In some implementations, it is desirable to position the turbine-generator 718 as low as possible in the first fluid communication channel 712 while avoiding contact with the static fluid level of fluid collected at the bottom of the first fluid communication channel 712. That minimum height may vary depending on a variety of factors including, for example, the aquifer's permeability and saturation level and the rate of fluid flow that the first fluid communication channel 712 can accommodate.

If the aquifer's permeability were low, for example, then it may be desirable to position the turbine-generator 718 higher in the first fluid communication channel 718. This is because of the possibility that the bottom of the first fluid communication channel 712 might fill up with fluid if the rate of fluid flow in the channel 712 exceeds the aquifer's ability to absorb fluid. If the fluid level were to rise to the turbine-generator 718, fluid flow through that turbine-generator would be stopped or severely limited.

An aquifer's saturation level can affect its ability to absorb additional fluid. Accordingly, if the aquifer's saturation level were particularly high (e.g., if the aquifer were highly saturated), then it may be desirable to position the turbine-generator 718 higher in the second fluid communication channel 712. This can help avoid the situation in which fluid accumulation in the second communication channel results in a rise in the fluid level that reaches the turbine-generator 718 and compromises fluid flow through the turbine-generator 718.

In the illustrated implementation, an injection pump 750 is provided below the expected static fluid level in the first fluid communication channel 712 and below the turbine-generator 718. The illustrated injection pump 750 is arranged to help urge fluid from the fluid collection area at the bottom portion of the first fluid communication channel 712 into the aquifer 710. The injection pump 750, therefore, helps avoid the possible problems associated with accumulation of fluid at the bottom of the first fluid communication channel 712.

Typically, pump 716 is a submersible pump and, in the illustrated implementation, it is located below the aquifer's fluid level. It is generally desirable that the pump 716 be located as low as possible, and preferably well below, the aquifer's fluid level. Locating the pump 716 as low as possible helps to ensure that a positive pressure exists at the pump's inlet.

If the pump 716 itself is not located below the aquifer's fluid level, then the pump's suction line should extend below, and preferably well below, the fluid level. Extending the pump's suction line well below the fluid level helps to ensure that the pump 716 will be able to continue moving fluid out of the aquifer 710 even if only a small amount of fluid is present in the aquifer 710.

If the pump 716 is intended to operate from a position above the aquifer's fluid level (under any operating conditions), it may include a means for priming (not shown). In general, the means for priming may be adapted to substantially fill the pump-turbine's casing with fluid prior to it starting to operate. In some implementations, the priming means is a vacuum pump or an air ejector. In some implementations, the pump 716 is adapted for self-priming when it begins operating. Alternatively, a foot or check valve may be used to retain liquid within the pump's 716 suction line. In some implementations, a separate, submersible priming pump is positioned in the aquifer 710 and is operable to prime the pump 716 when it is to be operated.

The pump 716 can be adapted to function in a number of ways, for example, as a rotodynamic pump (e.g., a centrifugal pump) or as a positive displacement pump (e.g., a reciprocating pump). The pump can be powered by any type of prime mover including, for example, an electric motor, a hydraulic motor or even an engine.

In the illustrated implementation, the heat exchanger 711 is positioned just above the earth's surface 711. In other implementations, however, the heat exchanger 711 can be at any elevation. However, generally the heat exchanger 711 is located at an elevation higher than the aquifer 710. In some implementations, the higher elevation may still be subterranean.

In the illustrated implementation, the first 712 and second 714 fluid communication channels are formed from pipes that extend respectively from the inlet and outlet of the heat exchanger 711, down bore holes in the earth and to the aquifer 710. In the illustrated implementation, valves 720, 722 are provided in each of the first and second fluid communication channels 712, 714. These valves 720, 722 help to control fluid flow through the channels.

The illustrated implementation also includes a controller 741 which, in various implementations, controls and/or automates various aspects of the system's 700 operations. For example, in some implementations, the controller 741 controls the pumps 716, 750, the turbine-generator 718 and/or the valves 720, 722. Additionally, in some implementations, the controller 741 receives data from various sensors associated with the system to help automate its functioning. Such sensors can include, for example, fluid level sensors, fluid flow meters, temperature sensors, pressure sensors.

Figure 8:
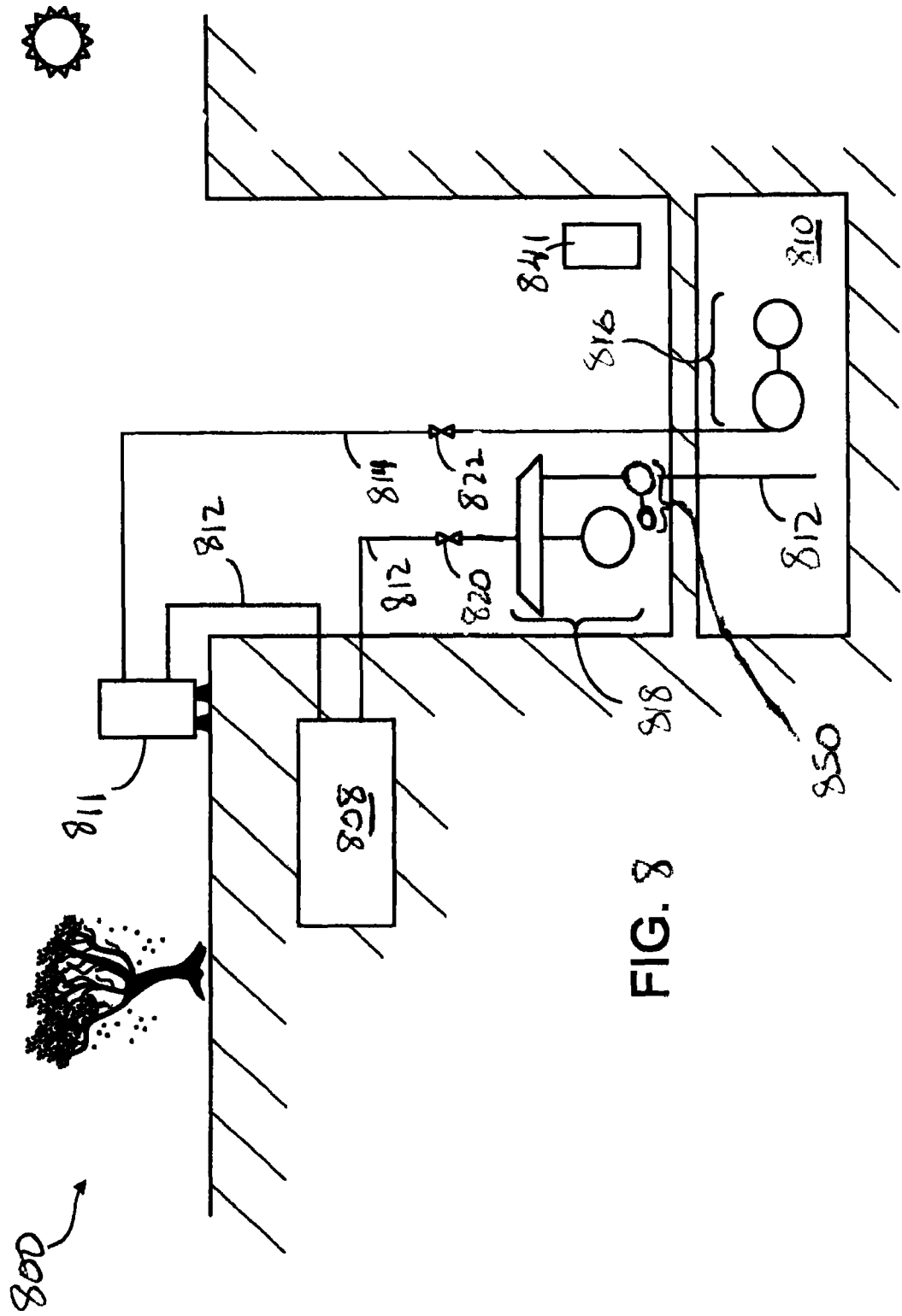
FIG. 8 is a cross-sectional view showing another implementation of a system for accessing fluid for use in connection with domestic or industrial applications.

Like the system of FIG. 7, the system 800 of FIG. 8 enables fluid to be taken from a subterranean aquifer 810 and to be used in connection with a domestic or industrial application in a highly cost-efficient manner. Additionally, the system 800 of FIG. 8 acts as a hydroelectric pumped-storage facility that stores and/or produces energy by moving fluid between two or more aquifers. The energy produced may be used to satisfy demand on an electrical supply system, particularly during periods of relatively high demand. Accordingly, the system 800 of FIG. 8 is particularly cost-efficient.

The illustrated system 800 includes a fluid collection area 808 (e.g., a second aquifer) located above the aquifer 810. The fluid collection area 808 collects and temporarily stores fluid after it has been used (e.g., by heat exchanger 811) for a domestic or industrial purpose, but before it is returned to the aquifer 810. The fluid collection area 224 can be, for example, a man-made or natural body of fluid hidden from or exposed at the earth's surface (e.g., a lake or reservoir) or any other vessel, structure or location that can hold fluid. An injection pump 850 is provided near the bottom of the first fluid communication channel 812. The injection pump 850 is arranged to urge fluid collected in the bottom portion of the first fluid communication channel 812 into the lower aquifer 810.

The illustrated system 800 generally operates as follows. The pump assembly 816 operates to pump fluid from the aquifer 810 up to heat exchanger 811. The heat exchanger 811 draws heat from the aquifer fluid for use in connection with a domestic or industrial application. Then, the fluid flows, substantially under the influence of gravity, from the heat exchanger 811 to the collection area 808, which in the illustrated implementation is a second aquifer. The fluid may be stored for some time in the collection area 808. At an appropriate time, the fluid may be released (e.g., by opening valve 820) and allowed to flow, substantially under the influence of gravity, through the valve 820 and through the turbine-generator 818. As the fluid flows through the turbine-generator 818, the turbine-generator converts the fluid's kinetic energy into electrical energy. After passing through the turbine-generator 818, the fluid tends to collect at a bottom portion of the fluid communication channel 812. The injection pump 850 helps to urge the collected fluid into the aquifer 810.

The turbine-generator 818 typically is arranged to supply the electrical energy into an electrical supply system (not shown). In some implementations, the release of fluid from the collection area 808 may be timed to coincide with periods of relatively high demand on the electrical supply system. Accordingly, the electrical energy created by the turbine-generator 818 can be used to help satisfy the relatively high demand.

The pump 816 typically is operated by an electrical motor that receives energy from the electrical supply system. In some implementations, the pump's 810 operation is timed to coincide with periods of relatively low demand on the electrical supply system.

Accordingly, it may be desirable for the controller 841 to monitor demand on the electrical supply system. In those instances, if the monitored demand exceeds a predetermined first value, the valve 820 is opened, thereby enabling fluid to flow substantially under the influence of gravity from the collection area 808, through the turbine-generator 818. During such high demand periods, the pump 816 typically is off and its valve 822 is closed. If, on the other hand, monitored demand drops below a predetermined second value, the pump 816 is turned on and its valve 822 opened so that fluid can move from the aquifer 810 to the means 811 and collection area 808. During such low demand periods, valve 820 typically is closed and the turbine-generator 818 typically is not operating.

Figure 9:
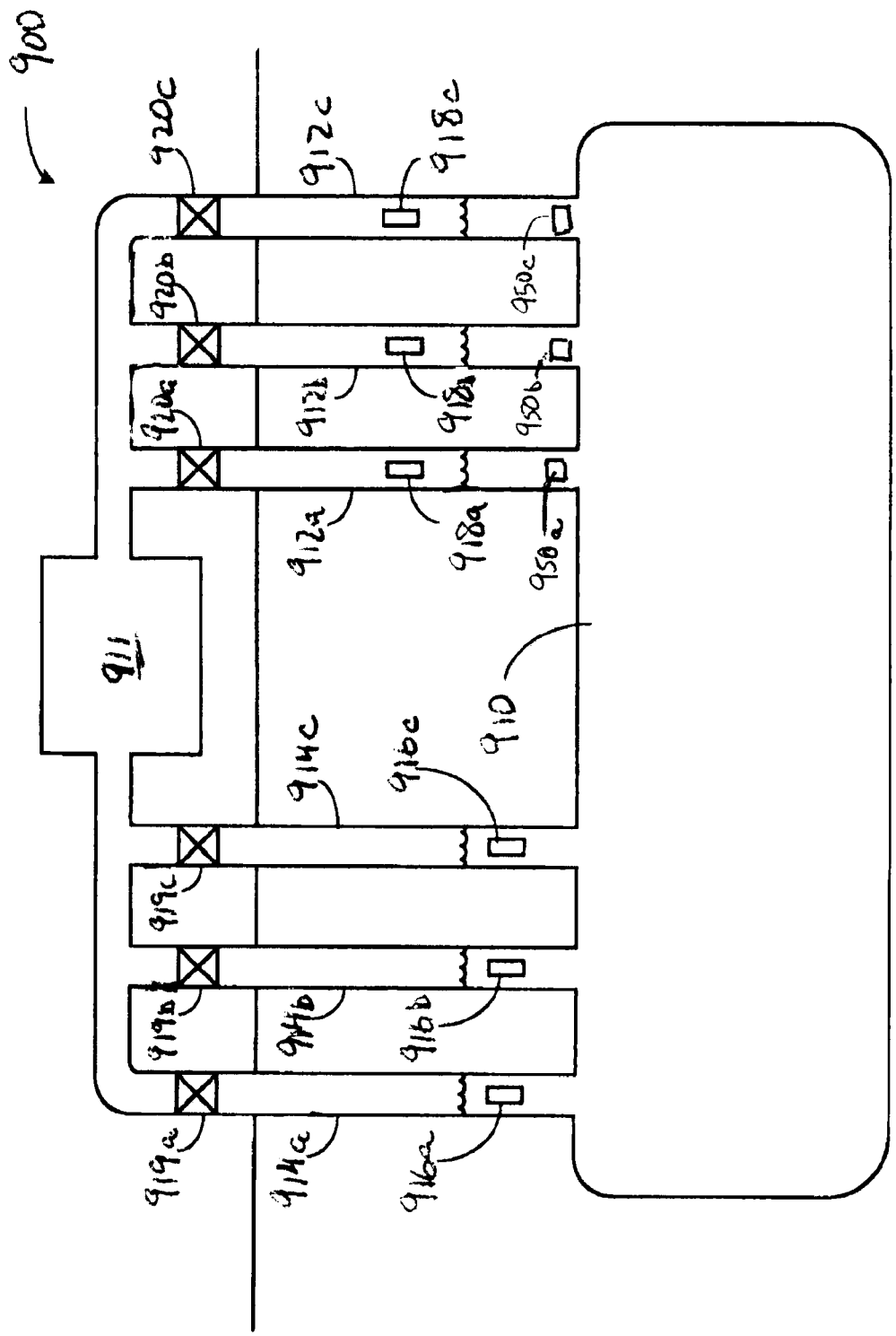
FIG. 9 is a cross-sectional view showing yet another implementation of a system for accessing fluid for use in connection with domestic or industrial applications.

The system 900 illustrated in FIG. 9 is similar in many respects to the system 700 illustrated in FIG. 7. The system 900, however, includes multiple first fluid communication channels 914a, 914b, 914c connected in parallel between the aquifer 910 and the heat exchanger 911. The system 900 in FIG. 9 also includes multiple second fluid communication channels 912a, 912b, 912c connected in parallel between the aquifer 910 and the heat exchanger 911.

A pump 916a, 916b, 916c is provided in each of the respective first fluid communication channels 914a, 914b, 914c. Under certain circumstances, it may be desirable to operate more than one of the pumps 916a, 916b, 916c simultaneously. For example, if the demands of the heat exchanger 911 are too high for one pump to satisfy, then more than one pump may be operated.

Each pump 916a, 916b, 916c draws fluid from a different part of the aquifer 910. Accordingly, if one part of the aquifer 910 (e.g., the part that pump 916a draws from) dries up, then another pump (e.g., pump 916b) can be operated to draw from a different part of the aquifer 910.

Check valves 919a, 919b, 919c are provided in each of the respective first fluid communication channels 914a, 914b, 914c. The check valves help to control flow of fluid in those channels and prevent undesirable reverse flow through those channels, particularly when one or more of the pumps 916a, 916b, 916c are operating, but not all of the pumps 916a, 916b, 916c are operating.

A turbine-generator 918, 918b, 918c is provided in each of the second fluid communication channels 912a, 912b, 912c. The turbine-generators may be operated one at a time. Under certain circumstances, it may be desirable to operate more than one of the turbine-generators 918a, 918b, 918c simultaneously. For example, if the supplemental demand on the electrical power supply system is too high for one turbine-generator to satisfy, then more than one turbine-generator can be operated simultaneously.

Valves 920a, 920b, 920c are provided in each respective second fluid communication channel 912a, 912b, 912c and are operable to control fluid flow through each respective channel. Each second fluid communication channel 912a, 912b, 912c returns fluid to a different part of the aquifer 910. If, for example, fluid flow results in one part of the aquifer (e.g., the part that corresponds to second communication channel 912a) becomes overly saturated, then the valve (e.g., valve 920a) that corresponds to the channel feeding that part of the aquifer could be closed and another valve (e.g., valve 920b) could be opened. This functionality could be automated in some embodiments.

Injection pumps 950a, 950b, 950c are provided in each of the second fluid communication channels 912a, 912b, 912c beneath the turbine-generators 918a, 918b, 918c and, preferably, beneath the expected static fluid levels at the bottom of the second fluid communication channels. The injection pumps 950a, 950b, 950c are arranged so as to urge fluid from the second fluid communication channels into the aquifer 910.

Figure 10:
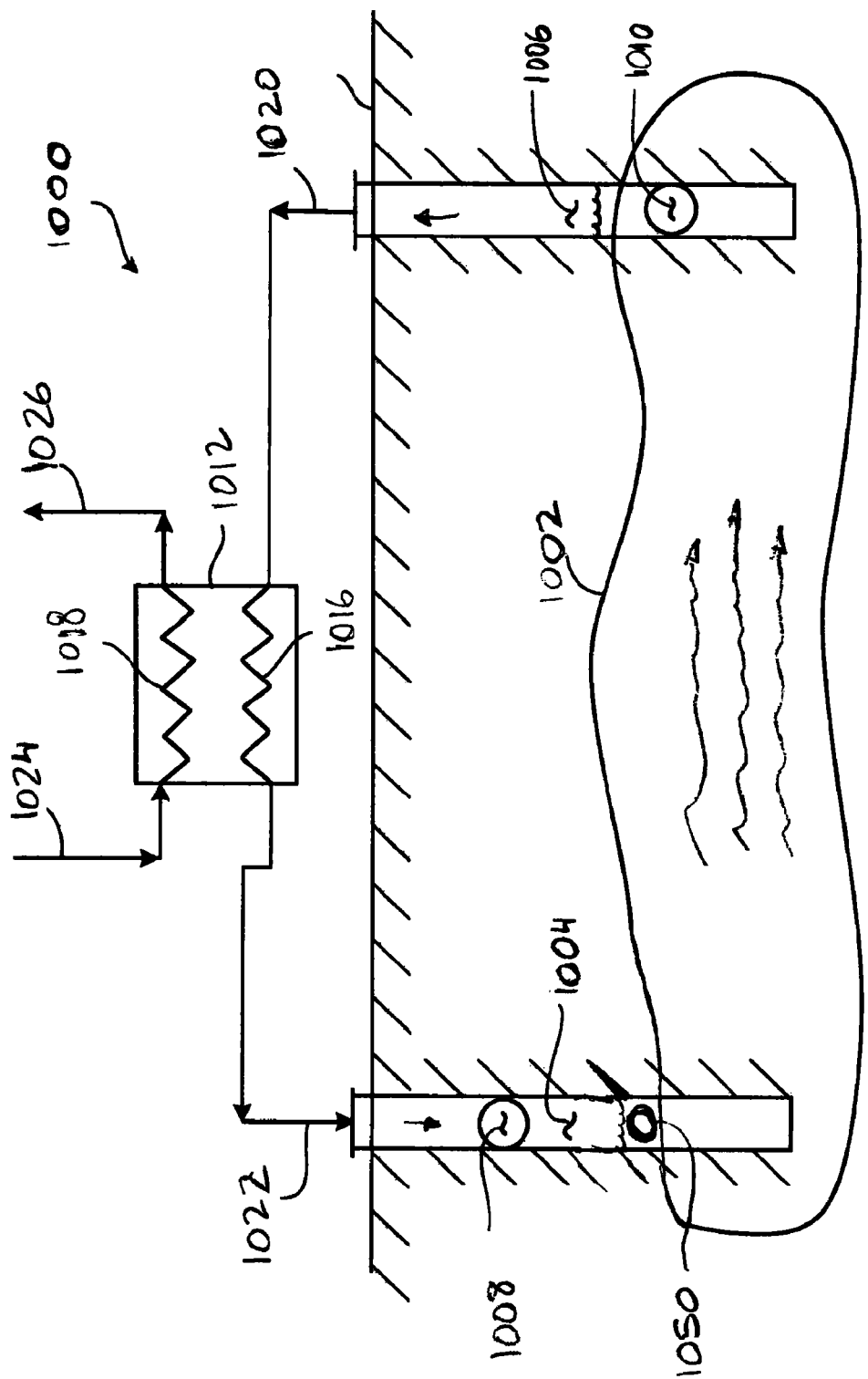
FIG. 10 is a cross-sectional view of a system for accessing fluid for use in connection with domestic or industrial applications.

The system 1000 of FIG. 10 is adapted to draw thermal energy from a subterranean fractured hot rock formation 1002, which in the illustrated implementation is a fractured hot dry rock formation.

The illustrated system 1000 includes a fluid injection well 1004 and a fluid production well 1006, which extend downward from the earth's surface and enable fluid communication to the fractured hot rock formation. The illustrated hot rock formation 102 is a subsurface rock structure that is heated by geothermal energy. The formation is fractured and one or more passages (not visible in FIG. 10) extend through and/or near the hot dry rock formation 1002. These passages are in thermal contact with the hot dry rock formation 1002 so that fluid carried therein can absorb heat from the hot rock formation 1002.

In the illustrated system 1000, the fluid injection well 1004 provides a channel through which fluids can be introduced to the passages through and/or near the hot rock formation 1002. The fluid production well 1006 also extends from the earth's surface 114 to the hot dry rock formation 1002. In the illustrated system, the fluid production well 1006 provides a channel through which fluid can be removed from the passages that extend through and/or near the hot rock formation 1002.

A turbine-generator 1008 is in the fluid injection well 1004 and is arranged to convert kinetic energy of fluid flowing downward through the fluid injection well 1004 into electrical energy. Typically, such fluid flows at least partially under the influence of gravity and, in some implementations, flows entirely under the influence of gravity. Typically, the fluid injection well 1004 is sufficiently large and the passage(s) in and around the hot rock formation 1002 have sufficient fluid carrying capacity to accommodate a substantially steady flow of fluid.

It is generally desirable that the turbine-generator 1008 be located as low as practical in the fluid injection well 1004 so that the fluid flowing through the turbine-generator 1008 will have fallen a great distance and, therefore, gained a large amount of kinetic energy. The turbine-generator 1008 should not, however, be so low in the fluid injection well 1004 that an undue risk exists that static fluid may accumulate in the bottom of the fluid injection well 1004 to a level that would unduly impede fluid flow through the turbine-generator 1008. For example, if it is expected that under certain operating conditions, static fluid might accumulate in the fluid injection well 1004 to a certain level, then it would be advisable that the turbine-generator 1008 be located above that level so that the turbine-generator 1008 does not become submerged during system operation.

In the illustrated implementation, an injection pump 1050 is positioned inside the injection well 1004. The injection pump is arranged to urge fluid that has accumulated in a bottom section of the injection well 1004 into the hot rock formation 1002. The injection pump 1050 is positioned between the turbine-generator 1008 and the hot rock formation 1002 and is below the expected fluid level in the injection well 1004.

Determining the turbine-generator's ideal height in the fluid injection well 1004 may involve considering, among other things, the ability of the passages in and/or near the hot dry rock formation 1002 to absorb fluid, the size of the fluid injection well 1004, the size of the fluid production well 1006, how far below the earth's surface the hot dry rock formation 1002 is located and the capacity of the injection pump 1050.

A production pump 1010 is located in the fluid production well 1006 and arranged to remove fluid from fluid production well 1006 and the passages that extend through and/or near the hot dry rock formation 1002. It is generally desirable that the pump be located lower than the expected static fluid level in the fluid production well 1006.

A heat exchanger 1012 is arranged to extract heat from heated fluid that comes out of the production well 1006 for use in connection with a domestic or industrial application. The illustrated heat exchanger is above the earth's surface and includes a primary fluid circuit 1016 and a secondary fluid circuit 1018. The illustrated heat exchanger 1012 is arranged so that fluid from the hot rock formation 1002 flows through the primary fluid circuit 1016 and a working fluid to be heated flows through the secondary fluid circuit 1018. The primary 1016 and secondary 1018 fluid circuits are thermally coupled to one another so that heat from fluid flowing in the primary fluid circuit 1016 can transfer to fluid flowing in the secondary fluid circuit 1018.

A first set of pipes 1020, 1022 extends between the heat exchanger's 1012 primary fluid circuit 1016 and the fluid injection and fluid production wells 1004, 1006, respectively. A second set of pipes 1024, 126 extends from the heat exchanger's 1012 secondary fluid circuit 1018 to an external device or devices (not illustrated).

During system 100 operation, fluid is introduced to the fluid passage(s) that are in thermal contact with the hot dry rock formation 1002 through fluid injection well 1004. Fluid flows downward in the fluid injection well 1004 at least partially (if not entirely) under the influence of gravity. That fluid flows through the turbine-generator 1008. The turbine-generator 1008 converts the flowing fluid's kinetic energy into electrical energy. This electrical energy is delivered to an electrical power system (not illustrated in FIG. 10) for use in connection with a domestic or industrial application.

At least some of the fluid that passes through the turbine-generator 1008 can accumulate in a collection area at the bottom of the injection well 1004 before passing into the hot rock formation. The injection pump 1050 operates to help move this accumulated fluid into the hot rock formation, thereby helping to overcome the hot rock formation's resistance to fluid flow.

Fluid then flows from the fluid injection well 1004 to the fluid production well 106 through one or more passages (e.g., fractures in the hot dry rock formation 102 that are not illustrated in FIG. 1) in and/or near the hot dry rock formation 102, absorbing heat from the hot dry rock formation 102 along the way. The amount of heat that the fluid absorbs depends, inter alia, on the temperature of the hot dry rock formation 102, the distance between wells 104, 106, the physical configuration of the passages that extend between wells and the rate of fluid flow through the passages. Once the fluid has been heated, pump 110 pumps the heated fluid upward and out of the fluid production well 106.

The heated fluid then flows through pipe 122 into the heat exchanger 112, which extracts heat from the heated fluid for use in connection with a domestic or industrial application. More particularly, the heated fluid enters the heat exchanger's primary fluid circuit 116. Working fluid is provided to the heat exchanger's 112 secondary fluid circuit 118 via pipe 124 and is removed from the heat exchanger's 112 secondary fluid circuit 118 via pipe 126. The working fluid in the heat exchanger 112 is heated by hot fluid in the primary fluid circuit 116 and may be, for example, flashed to steam (or other vapor) which is used to turn a turbine-generator to generate electric power. In general, heat that is extracted from the heated fluid is used in connection with some industrial or domestic application.

Once heat is extracted, fluid returns to the fluid introduction well 104 via pipe 120. Make-up fluid may be added to the system 100, for example, at a point on pipe 120 (not shown) in order to replace water lost by leakage.

A number of embodiments of the invention have been described. Nevertheless, it will be understood that various modifications may be made without departing from the spirit and scope of the invention.

For example, to help ensure that a sufficient amount of water continues to flow through the turbine, the first fluid communication channel 212 may include multiple pipes that extend from the turbine to the lower aquifer. The pipes may terminate at different locations in the aquifer so that, for example, if one of the locations becomes too saturated to continue absorbing fluid, it is likely that at least some of the other locations will be able to continue absorbing fluid. Accordingly, a sufficient amount of fluid flow through the first communication channel 212 may be sustained to ensure that the turbine-generator continues to operate.

As another example, a hydroelectric pumped storage facility may be adapted to move fluid between three or more aquifers in order to store and/or release energy.

The techniques disclosed herein can be implemented with various types of aquifers including, for example, saturated and unsaturated aquifers, as well as confined and unconfined aquifers. One or more of the aquifers can be man-made. Multiple fluid communication channels may be connected to a single turbine and/or to a single pump. That may enable a greater amount of fluid to flow between aquifers. Determining when to move fluid from one aquifer to another may be influenced by a wide variety of considerations. For example, fluid may be moved from a lower aquifer to an upper aquifer during the night and from the upper aquifer to the lower aquifer during the day.

In some implementations, a higher body of water, such as a reservoir, could be on a hill or a mountain and fluid could be led from the higher body of water, to a plenum located, for example, at a surface of the earth just above an aquifer. Fluid may be stored temporarily in the plenum and released down to the aquifer at a later time. One or more turbine-generators could be located between the higher body of water and the plenum. The one or more turbine-generators could be arranged to convert the kinetic energy of the fluid flowing substantially under the influence of gravity from the higher body of water to the plenum into electrical energy. Another one or more turbine-generators optionally could be located between the plenum and the aquifer. These one or more turbine-generators could be adapted to convert the kinetic energy of the fluid flowing from the plenum to the aquifer into electrical energy. In this arrangement, an injection pump may be provided near the aquifer to pump fluid into the aquifer.

Additionally, the bore holes that house some of the components disclosed herein can have different sizes and shapes. Some components including, for example, parts of the fluid communication channel(s) may be located above ground. Some implementations may include multiple pumps and/or multiple turbines associated with a single fluid communication channel. The valves in the fluid communication channels may be configured in a variety of ways. Multiple valves may be situated at different sections in each fluid communication channel.

Moreover, the generator can be adapted to synchronize and connect to the electrical supply system in a variety of ways. In some implementations, synchronization and connection is automated and controlled, for example, by the controller.

The aquifer fluid can be used for any type of domestic or industrial application. Such uses include heating, cooling, and use in connection with turbine systems, including binary turbines, to create electricity. The phrase "domestic or industrial application" as used herein includes any use that aquifer fluid may be put to. The phrase "turbine-generator" includes any component or combination of components capable of converting kinetic or potential energy of a fluid into electrical energy.

The fluid sensor that senses fluid level to control injection pump operation can be positioned at any elevation. It may be above or below/upstream or downstream of the turbine-generator.

Accordingly, other implementations are within the scope of the claims.

What is claimed is:

1. A method comprising:
monitoring demand on an electrical supply system;
if the monitored demand exceeds a predetermined first value:
  enabling fluid to flow substantially under the influence of gravity from a first elevation through a turbine-generator;
  in the turbine-generator, converting kinetic energy associated with the flowing fluid into electrical energy;
  collecting a portion of the fluid in an area downstream of the turbine generator; and
  pumping the collected fluid from the area downstream of the turbine-generator into a subterranean reservoir with an injection pump; and
if the monitored demand drops below a predetermined second value, moving fluid from the subterranean reservoir to the first elevation.

2. The method of claim 1 wherein the injection pump is located between the turbine-generator and the subterranean reservoir, relative to a flow path of the fluid.

3. The method of claim 1 further comprising:
sensing a fluid level within the area downstream of the turbine-generator; and
controlling the injection pump's operation based on the sensed fluid level.

4. The method of claim 1 further comprising:
sensing a pressure associated with the collected fluid in the area downstream of the turbine-generator; and
controlling the injection pump's operation based on the sensed pressure.

5. The method of claim 1 wherein the subterranean reservoir comprises an aquifer.

6. The method of claim 1 wherein the subterranean reservoir comprises a fractured hot dry rock.

7. The method of claim 1 wherein the first elevation is higher than the subterranean reservoir.

8. A system comprising:
a collection of water at a first elevation;
a subterranean reservoir at a second elevation lower than the first elevation;
one or more fluid communication channels to facilitate fluid communication between the collection of water and the subterranean reservoir;
a turbine-generator to create electrical energy from kinetic energy of fluid flowing from the collection of water to the subterranean reservoir inside one of the fluid communication channels;
a fluid collection area downstream of the turbine-generator to at least temporarily collect fluid that has passed through the turbine-generator; and
an injection pump to move accumulated fluid in the collection area to the subterranean reservoir.

9. The system of claim 8 further comprising:
a fluid level sensor to sense a fluid level in the collection area; and
a controller to control the injection pump's operation based on the fluid level sensed by the fluid level sensor.

10. The system of claim 8 further comprising:
a pressure sensor to sense a pressure associated with the fluid collected in the collection area, wherein the sensed pressure provides an indication of fluid level in the collection area; and
a controller to control the injection pump's operation based on the pressure sensed by the pressure sensor.

11. The system of claim 8 wherein the injection pump is located between the turbine-generator and the subterranean reservoir relative to a flow path of the fluid.

12. The system of claim 8 wherein the subterranean reservoir comprises an aquifer.

13. The system of claim 8 wherein the subterranean reservoir comprises a fractured hot dry rock.

14. The system of claim 8 further comprising a pump to move fluid from the subterranean reservoir to the collection of water at the first elevation.

15. A method comprising:
moving fluid from a subterranean reservoir to an elevation above the subterranean reservoir;
using the fluid at the higher elevation for a domestic or industrial application;
after using the fluid for the domestic or industrial application, enabling the fluid to flow from the higher elevation through a turbine-generator substantially under the influence of gravity;
converting kinetic energy of the flowing fluid into electrical energy with the turbine-generator;
collecting fluid that has passed through the turbine-generator at a collection area downstream of the turbine-generator; and
pumping fluid from the collection area into the subterranean reservoir with an injection pump.

16. The method of claim 15 wherein the injection pump is located between the turbine-generator and the subterranean reservoir relative to a flow path of the fluid.

17. The method of claim 15 further comprising:
sensing a fluid level within the collection area; and
controlling the injection pump's operation based on the sensed fluid level.

18. The method of claim 15 further comprising:
sensing a pressure associated with the fluid in the collection area; and
controlling the injection pump's operation based on the sensed pressure.

19. The method of claim 15 wherein the subterranean reservoir comprises an aquifer.

20. The method of claim 15 wherein the subterranean reservoir comprises a fractured hot dry rock.

21. The method of claim 15 wherein the fluid is moved from the subterranean reservoir to the higher elevation through a first fluid communication channel and returned to the subterranean reservoir through a second fluid communication channel.

22. A method comprising:
monitoring demand on an electrical supply system;
if the monitored demand exceeds a predetermined first value:
enabling fluid to flow substantially under the influence of gravity from a first elevation that is higher than a subterranean reservoir through a turbine-generator;
converting kinetic energy associated with the flowing fluid into electrical energy at the turbine-generator;
collecting fluid in a collection area at an elevation lower than the turbine-generator; and
pumping collected fluid from the collection area into the subterranean reservoir; and
if the monitored demand drops below a predetermined second value:
moving fluid from the subterranean reservoir to the first, higher elevation; and
when the fluid is at or near the higher elevation, using the fluid for a domestic or industrial application.

\* \* \* \* \*